United States Patent
Oota et al.

(10) Patent No.: US 11,691,392 B2
(45) Date of Patent: Jul. 4, 2023

(54) INTERLAYER FILM FOR LAMINATED GLASS AND LAMINATED GLASS

(71) Applicant: SEKISUI CHEMICAL CO., LTD., Osaka (JP)

(72) Inventors: Yuusuke Oota, Moriyama (JP); Atsushi Nohara, Kusatsu (JP); Daisuke Nakajima, Land Nordrhein-Westfalen (DE)

(73) Assignee: SEKISUI CHEMICAL CO., LTD., Osaka (JP)

( * ) Notice: Subject to any disclaimer, the term of this patent is extended or adjusted under 35 U.S.C. 154(b) by 217 days.

(21) Appl. No.: 17/421,125

(22) PCT Filed: Jan. 8, 2020

(86) PCT No.: PCT/JP2020/000350
§ 371 (c)(1),
(2) Date: Jul. 7, 2021

(87) PCT Pub. No.: WO2020/145322
PCT Pub. Date: Jul. 16, 2020

(65) Prior Publication Data
US 2022/0105711 A1    Apr. 7, 2022

(30) Foreign Application Priority Data
Jan. 9, 2019 (JP) ................. 2019-002212

(51) Int. Cl.
| B32B 17/10 | (2006.01) |
| C08G 4/00 | (2006.01) |
| C08J 5/18 | (2006.01) |
| C08K 5/11 | (2006.01) |
| C08K 5/12 | (2006.01) |

(52) U.S. Cl.
CPC ........ B32B 17/10761 (2013.01); B32B 17/10 (2013.01); B32B 17/10036 (2013.01); B32B 17/10605 (2013.01); B32B 17/10614 (2013.01); C08G 4/00 (2013.01); C08J 5/18 (2013.01); C08K 5/11 (2013.01); C08K 5/12 (2013.01); *B32B 2307/7246* (2013.01); *C08J 2361/00* (2013.01)

(58) Field of Classification Search
CPC .............. B32B 17/10761; B32B 17/10; B32B 17/10036; B32B 17/10605; B32B 17/10614; B32B 2307/7246; C08G 4/00; C08J 5/18; C08J 2361/00; C08K 5/11; C08K 5/12
USPC ...................................... 428/432
See application file for complete search history.

(56) References Cited

U.S. PATENT DOCUMENTS

| 7,125,607 | B2 * | 10/2006 | Wade ............... B32B 17/10688 524/400 |
| 10,981,360 | B2 * | 4/2021 | Oota ................ B32B 17/10761 |
| 2005/0009987 | A1 | 1/2005 | Hara et al. |
| 2005/0208315 | A1 * | 9/2005 | Wade ............... B32B 17/10761 428/500 |
| 2007/0178314 | A1 | 8/2007 | Marumoto |
| 2012/0064323 | A1 | 3/2012 | Shoemake et al. |
| 2019/0358936 | A1 * | 11/2019 | Oota ...................... C08K 5/098 |

FOREIGN PATENT DOCUMENTS

| CN | 1572829 | 2/2005 |
| CN | 101111459 | 1/2008 |
| EP | 1 479 726 | 11/2004 |
| EP | 3 176 136 | 6/2017 |
| JP | 6-502595 | 3/1994 |
| JP | 8-119687 | 5/1996 |
| JP | 08119687 A * | 5/1996 |
| JP | 2001-72445 | 3/2001 |
| JP | 2001-504429 | 4/2001 |
| JP | 2007-529598 | 10/2007 |
| JP | 2008-518806 | 6/2008 |
| JP | 2015-40165 | 3/2015 |
| JP | 2015040165 A * | 3/2015 |

OTHER PUBLICATIONS

International Search Report dated Apr. 7, 2020 in International (PCT) Application No. PCT/JP2020/000350.

* cited by examiner

*Primary Examiner* — Michael M. Bernshteyn
(74) *Attorney, Agent, or Firm* — Wenderoth, Lind & Ponack, L.L.P.

(57) ABSTRACT

An interlayer film for laminated glass of the present invention comprises a thermoplastic resin, a carboxylic acid, and an alkali (alkaline earth) metal, wherein, when a molar concentration per unit volume of the alkali (alkaline earth) metal in the interlayer film for laminated glass, measured by ICP atomic emission spectrophotometry is A (mol/m$^3$); a molar concentration per unit volume of the carboxylic acid in the interlayer film for laminated glass, measured by GC-MS is B (mol/m$^3$); a molar concentration per unit volume of the carboxylic acid in the interlayer film for laminated glass, measured by GC-MS after a hydrochloric acid aqueous solution is added to the interlayer film for laminated glass to be left at 23° C. for 12 hours is Y; and a molar concentration per unit volume of the carboxylic acid, obtained by subtracting the molar concentration B from the concentration Y is D (mol/m$^3$), the molar concentration A is more than 0.35 mol/m$^3$ and less than 1.00 mol/m$^3$, and a carboxylic acid isolation ratio (1) represented by $(1-D/A) \times 100$ is 40% or less.

12 Claims, No Drawings

INTERLAYER FILM FOR LAMINATED GLASS AND LAMINATED GLASS

TECHNICAL FIELD

The present invention relates to an interlayer film for laminated glass, and laminated glass including the interlayer film for laminated glass.

BACKGROUND ART

Even if laminated glass is externally shocked and damaged, bits of glass are less likely to be shattered, which is safe, so that the laminated glass is widely used as windshield of vehicles including automobiles, and windowpanes of buildings and the like. Laminated glass including a pair of glass plates and an interlayer film for laminated glass containing a resin component such as a polyvinyl acetal resin interposed between the pair of glass plates for integrating is widely known.

When an adhesive force between the glass and the interlayer film for laminated glass is small, the glass damaged by shock is peeled off from the interlayer film and shattered. When the adhesive force is large, the glass and the interlayer film are simultaneously damaged, which causes penetration to occur. This makes it necessary to adjust the adhesive force between the interlayer film for laminated glass and the glass within a proper range. It is known that an adhesive force regulator is blended in the interlayer film for laminated glass. As the adhesive force regulator, a potassium salt, sodium salt, and magnesium salt and the like of a carboxylic acid are known (for example, see PTLs 1 to 4).

CITATION LIST

Patent Literatures

PTL 1: JP 2001-504429 W
PTL 2: JP 2007-529598 W
PTL 3: JP 2008-518806 W
PTL 4: JP 06-502595 W

SUMMARY OF INVENTION

Technical Problem

However, when the adhesive force regulator is blended in the interlayer film for laminated glass, the moisture resistance of the interlayer film for laminated glass may be deteriorated. For example, when the interlayer film for laminated glass is used in an environment of high temperature and high humidity for a long period of time, whitening may occur in a peripheral part of the interlayer film for laminated glass. Meanwhile, when the blending amount of the adhesive force regulator are decreased so as to provide good moisture resistance, the adhesive force may be unable to be adjusted within a proper range.

Then, it is an object of the present invention to provide an interlayer film for laminated glass which contains an adhesive force regulator blended to adjust an adhesive force within a proper range, and can have good moisture resistance.

Solution to Problem

As a result of intensive studies, the present inventors have found that, when at least one of a carboxylic acid alkali metal salt or a carboxylic acid alkaline earth metal salt is used as an adhesive force regulator, a carboxylic acid is isolated from a carboxylic acid metal salt, and the isolation ratio of a carboxylic acid in an interlayer film is suppressed to equal to or less than a prescribed value, whereby the above problems can be solved, and have completed the following present invention.

That is, the present invention provides the following [1] to [12].

[1] An interlayer film for laminated glass comprising: a thermoplastic resin; a carboxylic acid; and at least one metal selected from the group consisting of an alkali metal and an alkaline earth metal, wherein, when a molar concentration per unit volume of the alkali metal and the alkaline earth metal in the interlayer film for laminated glass, measured by ICP emission spectrophotometry is A (mol/m$^3$);

a molar concentration per unit volume of the carboxylic acid in the interlayer film for laminated glass, measured by gas chromatography mass spectrometry (GC-MS) is B (mol/m$^3$);

a molar concentration per unit volume of the carboxylic acid in the interlayer film for laminated glass, measured by gas chromatography mass spectrometry (GC-MS) after 9 mL of THF and 0.2 mL of a 1 mol/L hydrochloric acid aqueous solution are added to 0.5 g of the interlayer film for laminated glass to be left at 23° C. for 12 hours is Y (mol/m$^3$); and a molar concentration per unit volume of the carboxylic acid, obtained by subtracting the molar concentration B from the molar concentration Y is D (mol/m$^3$), the molar concentration A is more than 0.35 mol/m$^3$ and less than 1.00 mol/m$^3$, and a carboxylic acid isolation rate (1) represented by (1−D/A)×100 is 40% or less.

[2] An interlayer film for laminated glass comprising: a thermoplastic resin; a carboxylic acid; and at least one metal selected from the group consisting of an alkali metal and an alkaline earth metal, wherein, when a molar concentration per unit volume of the alkali metal and the alkaline earth metal in the interlayer film for laminated glass, measured by ICP emission spectrophotometry is A (mol/m$^3$); and a molar concentration per unit volume of the carboxylic acid in the interlayer film for laminated glass, measured by gas chromatography mass spectrometry (GC-MS) is B (mol/m$^3$), the molar concentration A is more than 0.35 mol/m$^3$ and less than 1.00 mol/m$^3$, and a carboxylic acid isolation rate (2) represented by B/A×100 is 40% or less.

[3] An interlayer film for laminated glass comprising: a thermoplastic resin; a carboxylic acid; at least one metal selected from the group consisting of an alkali metal and an alkaline earth metal; and 2-ethylhexanoic acid, wherein, when a molar concentration per unit volume of the alkali metal and the alkaline earth metal in the interlayer film for laminated glass, measured by ICP emission spectrophotometry is A (mol/m$^3$);

a molar concentration per unit volume of the carboxylic acid other than 2-ethylhexanoic acid in the interlayer film for laminated glass, measured by gas chromatography mass spectrometry (GC-MS) is B' (mol/m$^3$);

a molar concentration per unit volume of the carboxylic acid other than 2-ethylhexanoic acid in the interlayer film for laminated glass, measured by gas chromatography mass spectrometry (GC-MS) after 9 mL of THF and 0.2 mL of 1 mol/L hydrochloric acid are added to 0.5 g of the interlayer film for laminated glass to be left at 23° C. for 12 hours is Y' (mol/m$^3$); and a molar concentration per unit volume of the carboxylic acid, obtained by subtracting the molar concentration B' from the molar concentration Y' is D' (mol/m$^3$), the molar concentration A is more than 0.35 mol/m$^3$ and less than 1.00 mol/m$^3$, and a carboxylic acid isolation rate (3) represented by (1−D'/A)×100 is 40% or less.

[4] An interlayer film for laminated glass comprising: a thermoplastic resin; a carboxylic acid; at least one metal selected from the group consisting of an alkali metal and an alkaline earth metal; and 2-ethylhexanoic acid, wherein, when a molar concentration per unit volume of the alkali metal and the alkaline earth metal in the interlayer film for laminated glass, measured by ICP emission spectrophotometry is A (mol/m$^3$); and a molar concentration per unit volume of the carboxylic acid other than 2-ethylhexanoic acid in the interlayer film for laminated glass, measured by gas chromatography mass spectrometry (GC-MS) is B' (mol/m$^3$), the molar concentration A is more than 0.35 mol/m$^3$ and less than 1.00 mol/m$^3$, and a carboxylic acid isolation rate (4) represented by B'/A× 100 is 40% or less.

[5] The interlayer film for laminated glass according to any one of the above [1] to [4], wherein the metal contains potassium.

[6] The interlayer film for laminated glass according to the above [5], wherein, when a molar concentration per unit volume of the potassium in the interlayer film for laminated glass, measured by ICP emission spectrophotometry is C (mol/m$^3$), C/A is 0.6 or more.

[7] The interlayer film for laminated glass according to any one of the above [1] to [6], wherein the carboxylic acid contains acetic acid.

[8] The interlayer film for laminated glass according to any one of the above [1] to [7], wherein a content of formic acid is 0.2 parts by mass or less per 100 parts by mass of the thermoplastic resin.

[9] The interlayer film for laminated glass according to any one of the above [1] to [8], wherein the thermoplastic resin is a polyvinyl acetal resin.

[10] The interlayer film for laminated glass according to any one of the above [1] to [9], further comprising a luminescent material.

[11] The interlayer film for laminated glass according to the above [10], wherein the luminescent material has a terephthalic acid ester structure.

[12] Laminated glass comprising: the interlayer film for laminated glass according to any one of the above [1] to [11]; and two glass plates, wherein the interlayer film for laminated glass is disposed between the two glass plates.

Advantageous Effects of Invention

The present invention provides an interlayer film for laminated glass which can have an adhesive force adjusted within a proper range and good moisture resistance.

DESCRIPTION OF EMBODIMENTS

Hereinafter, the present invention will be described in detail with reference to an embodiment.
<Interlayer Film for Laminated Glass>

An interlayer film for laminated glass of the present invention contains a thermoplastic resin, a carboxylic acid, and at least one metal selected from the group consisting of an alkali metal and an alkaline earth metal (hereinafter, the alkali metal and the alkaline earth metal may be collectively referred to as "alkali (alkaline earth) metal"). Hereinafter, components contained in the interlayer film for laminated glass will be described in more detail.

[At Least One Metal Selected from Group Consisting of Alkali Metal and Alkaline Earth Metal]

The alkali metal is a metal belonging to group 1 of the periodic table, and specific preferred examples thereof include sodium and potassium. The alkaline earth metal is a metal belonging to group 2 of the periodic table, and specific preferred examples thereof include magnesium and calcium.

The alkali (alkaline earth) metals may be used singly or in combinations of two or more thereof.

Among the above metals, the alkali metal is preferable, and potassium is particularly preferable. When potassium is used, a molar concentration A and a carboxylic acid isolation rate are adjusted within predetermined ranges as described later, whereby an adhesive force is likely to be adjusted within a proper range while moisture resistance is satisfactorily maintained. As described later, when a luminescent material, particularly a luminescent material having a terephthalic acid ester structure is used, the coloring of the interlayer film caused by the luminescent material can be prevented.

When potassium is used as the alkali (alkaline earth) metal, potassium may be used alone, or may be used in combination with another metal. When potassium is used in combination with another metal, potassium and magnesium are preferably used in combination. The adhesive force is likely to be adjusted within a more proper range by using potassium and magnesium in combination.

The at least one metal selected from the group consisting of an alkali metal and an alkaline earth metal is preferably a metal derived from a carboxylic acid metal salt.
[Carboxylic Acid]

Examples of the carboxylic acid include a C1 to C16 carboxylic acid, and the carboxylic acid is preferably a C2 to C16 carboxylic acid, and more preferably a C2 to C8 carboxylic acid. The carboxylic acid is not particularly limited, and may be aliphatic or aromatic. The carboxylic acid is preferably an aliphatic carboxylic acid, and more preferably an aliphatic monocarboxylic acid. Suitable specific examples of the carboxylic acid include acetic acid, propionic acid, 2-ethyl butanoic acid, and 2-ethylhexanoic acid, and among these, the acetic acid is particularly preferable. The carboxylic acids may be used singly or in combinations of two or more thereof.

When the carboxylic acid contains formic acid, the content of the formic acid is preferably 0.2 parts by mass or less, and preferably 0.1 parts by mass or less, per 100 parts by mass of the thermoplastic resin from the viewpoint of suppressing yellowing with time. The content of the formic acid is preferably less, and it is preferable that the formic acid is not substantially contained.

In the present invention, when the molar concentration per unit volume of the alkali metal and the alkaline earth metal in the interlayer film for laminated glass is A (mol/m$^3$), the molar concentration A is more than 0.35 mol/m$^3$ and less than 1.00 mol/m$^3$. When the molar concentration A is 0.35 mol/m$^3$ or less, a metal amount is excessively less, so that the adhesive force cannot be adjusted by the carboxylic acid metal salt, which may disadvantageously cause an excessively large adhesive force. Meanwhile, when the molar concentration A is 1.00 mol/m$^3$ or more, the metal amount is excessively large, so that, even if the concentration of an isolated carboxylic acid to be described later is reduced, the moisture resistance is insufficient. For example, when the interlayer film for laminated glass is used in an environment of high temperature and high humidity for a long period of time, whitening may occur in the peripheral part of the interlayer film for laminated glass.

The molar concentration A is measured by ICP emission spectrophotometry, and is calculated based on the total molar amount of an alkali metal atom and an alkaline earth metal atom contained in the interlayer film for laminated glass.

From the viewpoint of more properly adjusting the adhesive force, the molar concentration A is preferably 0.50 mol/m$^3$ or more, more preferably 0.70 mol/m$^3$ or more, and still more preferably 0.80 mol/m$^3$ or more. From the viewpoint of further improving the moisture resistance, the molar concentration A is preferably 0.95 mol/m$^3$ or less, and more preferably 0.90 mol/m$^3$ or less.

The carboxylic acid is preferably a carboxylic acid derived from a carboxylic acid metal salt, but it may contain a carboxylic acid different from the carboxylic acid metal salt.

The carboxylic acid metal salt is a salt formed from a carboxylic acid and an alkali (alkaline earth) metal. In the interlayer film for laminated glass, all of the carboxylic acid and the alkali (alkaline earth) metal may form a metal salt, but only a part thereof may form the metal salt. That is, a part of the carboxylic acid contained in the interlayer film may be isolated without forming the alkali (alkaline earth) metal and the metal salt. In the present invention, in the interlayer film, the molar concentration A of the alkali (alkaline earth) metal is set within the above predetermined range, and the isolation percentage of the carboxylic acid is reduced, whereby the moisture resistance can be improved, and the adhesive force can be adjusted within a proper range.

Specifically, at least any one of the following carboxylic acid isolation rates (1) to (4) is 40% or less.

(Carboxylic Acid Isolation Rate (1))

The molar concentration of the carboxylic acid per unit volume in the interlayer film for laminated glass is B (mol/m$^3$). The molar concentration per unit volume of the carboxylic acid in the interlayer film for laminated glass, measured by gas chromatography mass spectrometry (GC-MS) after 9 mL of THF and 0.2 mL of 1 mol/L hydrochloric acid are added to 0.5 g of the interlayer film for laminated glass to be left at 23° C. for 12 hours is Y (mol/m$^3$).

The molar concentration per unit volume of the carboxylic acid, obtained by subtracting the molar concentration B from the molar concentration Y is D (mol/m$^3$). A carboxylic acid isolation rate (1) is represented by $(1-D/A) \times 100$ from the molar concentrations A and D.

When hydrochloric acid which is a strong acid is added to the interlayer film for laminated glass, all of the carboxylic acid derived from the carboxylic acid metal salt and the other carboxylic acid, which are blended in the interlayer film for laminated glass, are isolated as the carboxylic acid during the neutralization reaction. Therefore, the molar concentration Y per unit volume of the carboxylic acid after the strong acid is added to the interlayer film for laminated glass is equal to the total molar concentration of the carboxylic acid derived from the carboxylic acid metal salt, and the other carboxylic acid, contained in the interlayer film.

Meanwhile, the molar concentration B represents the molar concentration of the total amount of an isolated carboxylic acid of the carboxylic acid metal salt and a carboxylic acid other than the carboxylic acid derived from the carboxylic acid metal salt in the interlayer film for laminated glass. Therefore, the molar concentration D obtained by subtracting the molar concentration B from the molar concentration Y is equal to the concentration of the carboxylic acid metal salt in which the carboxylic acid is not isolated, in the carboxylic acid metal salt.

Therefore, when the molar concentration per unit volume of the alkali (alkaline earth) metal in the interlayer film for laminated glass is A, "A−D" is the concentration of the isolated carboxylic acid derived from the carboxylic acid metal salt. $(A-D)/A \times 100$, that is, the above $(1-D/A) \times 100$ represents the concentration of the isolated carboxylic acid derived from the carboxylic acid metal salt in the interlayer film for laminated glass.

(Carboxylic Acid Isolation Rae (2))

A carboxylic acid isolation rate (2) is represented by the percentage of the molar concentration B to the molar concentration A of the alkali (alkaline earth) metal $(B/A \times 100)$.

In the case where the interlayer film for laminated glass substantially contains no carboxylic acid other than the carboxylic acid derived from the alkali (alkaline earth) metal, such as the case where the carboxylic acid is not blended in addition to the carboxylic acid metal salt, the molar concentration B (mol/m$^3$) of the carboxylic acid per unit volume in the interlayer film for laminated glass substantially represents the molar concentration of the isolated carboxylic acid derived from the carboxylic acid metal salt. Therefore, $(B/A \times 100)$ can also be said to represent the concentration of the isolated carboxylic acid derived from the carboxylic acid metal salt in the interlayer film for laminated glass.

(Carboxylic Acid Isolation Rate (3))

The molar concentration of the carboxylic acid other than 2-ethylhexanoic acid per unit volume in the interlayer film for laminated glass is B' (mol/m$^3$). The molar concentration per unit volume of the carboxylic acid other than 2-ethylhexanoic acid in the interlayer film for laminated glass, measured by gas chromatography mass spectrometry (GC-MS) after 9 mL of THF and 0.2 mL of 1 N hydrochloric acid are added to 0.5 g of the interlayer film for laminated glass to be left at 23° C. for 12 hours is Y' (mol/m$^3$). When the molar concentration per unit volume of the carboxylic acid, obtained by subtracting the molar concentration B' from the molar concentration Y' is D' (mol/m$^3$), a carboxylic acid isolation rate (3) is represented by $((1-D'/A) \times 100)$.

(Carboxylic Acid Isolation Rate (4))

A carboxylic acid isolation rate (4) is represented by the percentage of the molar concentration B' to the molar concentration A of the alkali (alkaline earth) metal $(B'/A \times 100)$.

In the interlayer film for laminated glass, triethylene glycol di-2-ethylhexanoate generally used as the plasticizer is synthesized by a dehydration condensation reaction between triethylene glycol and 2-ethylhexanoic acid. 2-ethylhexanoic acid may be produced by hydrolysis due to heating or the like. This may generally cause the interlayer film for laminated glass to contain the 2-ethylhexanoic acid as impurities. Therefore, when the interlayer film for laminated glass further contains 2-ethylhexanoic acid, the 2-ethylhexanoic acid may be previously removed to calculate the molar concentration as shown in the above (3) and (4) in the calculation of the above carboxylic acid isolation rate. More specifically, when it is clear that the 2-ethylhexanoic acid is contained as the carboxylic acid other than the carboxylic acid derived from the carboxylic acid metal salt, or when it is clear that only the 2-ethylhexanoic acid is substantially contained as the carboxylic acid other than the carboxylic acid derived from the carboxylic acid metal salt, the above carboxylic acid isolation rate may be calculated as shown in the above (3) and (4). When the carboxylic acid isolation rates (3) and (4) are calculated, the carboxylic acid derived from the carboxylic acid metal salt may be a carboxylic acid other than the 2-ethylhexanoic acid.

When the carboxylic acid isolation rate (1), (2), (3), or (4) is higher than 40%, the isolated carboxylic acid is increased, which makes it difficult to adjust the adhesive force within a proper range even if the molar concentration A is adjusted within the above range.

The carboxylic acid isolation rate (1), (2), (3), or (4) is preferably 38.5% or less, more preferably 35% or less, still more preferably 30% or less, and yet still more preferably 15% or less. When the carboxylic acid isolation rate is equal to or less than these upper limits, the adhesive force is likely to be adjusted within a proper range while the moisture resistance is satisfactorily maintained.

The carboxylic acid isolation rate (1), (2), (3), or (4) is preferably lower, but it may be, for example, 1% or more, or may be practically 3% or more.

The molar concentrations D, D', B, and B' of the carboxylic acid are calculated based on the amount of the carboxylic acid measured by gas chromatography mass spectrometry (GC-MS).

As described above, the alkali (alkaline earth) metal particularly preferably contains potassium. It is preferable that, when the molar concentration per unit volume of the potassium in the interlayer film for laminated glass is C (mol/m$^3$), the rate of the molar concentration C to the molar concentration A of the alkali (alkaline earth) metal (C/A) is 0.6 or more.

The adhesive force is likely to be adjusted within a proper range with C/A of 0.6 or more, while the moisture resistance is satisfactorily maintained. The coloring of the interlayer film for laminated glass caused by the luminescent material can be prevented with C/A of 0.6 or more, even when a luminescent material, particularly a luminescent material having a terephthalic acid ester structure is used. From the viewpoint of more effectively preventing the coloring caused by the luminescent material while satisfactorily maintaining the moisture resistance and the adhesiveness, C/A is more preferably 0.75 or more, still more preferably 0.9 or more, and most preferably 1.

The molar concentration C is calculated based on the molar amount of a potassium atom measured by ICP emission spectrophotometry.

The above molar concentration D is preferably more than 0.20 mol/m$^3$ and less than 0.95 mol/m$^3$. When the molar concentration D is within such a range, the adhesive force can be appropriately adjusted, and good moisture resistance can be provided. This is less likely to cause whitening to occur in the peripheral part of the interlayer film even if the interlayer film is used in an environment of high temperature and high humidity for a long period of time.

From the viewpoints of the adhesive force and the moisture resistance, the molar concentration D is preferably 0.25 mol/m$^3$ or more, more preferably 0.50 mol/m$^3$ or more, and still more preferably 0.62 mol/m$^3$ or more. The molar concentration D is preferably 0.90 mol/m$^3$ or less, more preferably 0.85 mol/m$^3$ or less, and still more preferably 0.82 mol/m$^3$ or less.

From the same viewpoint, when the interlayer film for laminated glass further contains 2-ethylhexanoic acid, the molar concentration D' is preferably more than 0.20 mol/m$^3$ and less than 0.95 mol/m$^3$. The molar concentration D' is preferably 0.25 mol/m$^3$ or more, more preferably 0.50 mol/m$^3$ or more, and still more preferably 0.62 mol/m$^3$ or more. The molar concentration D' is preferably 0.90 mol/m$^3$ or less, more preferably 0.85 mol/m$^3$ or less, and still more preferably 0.82 mol/m$^3$ or less.

In the calculation of the molar concentrations B, B', D, and D', it is necessary to consider the valences of the carboxylic acid and alkali (alkaline earth) metal. Therefore, for example, when the alkali (alkaline earth) metal atom is divalent and the carboxylic acid is monovalent, each of the molar concentrations B, B', D, and D' is calculated by dividing the molar amount of each of the carboxylic acids by 2. When alkali (alkaline earth) metal atoms having different valences are contained in the interlayer film for laminated glass and the carboxylic acid is monovalent, each of the molar concentrations B, B', D, and D' may be calculated by dividing the molar amount of the carboxylic acid by the valence of weighted average calculated according to the molar amount of each of metals contained in the interlayer film.

Specific examples of the carboxylic acid metal salt contained in the interlayer film include sodium acetate, sodium propionate, sodium 2-ethylbutanoate, sodium 2-ethylhexanoate, potassium acetate, potassium propionate, potassium 2-ethylbutanoate, potassium 2-ethylhexanoate, magnesium acetate, magnesium propionate, magnesium 2-ethylbutanoate, magnesium 2-ethylhexanoate, calcium acetate, calcium propionate, calcium 2-ethylbutanoate, and calcium 2-ethylhexanoate. Among these, potassium acetate and magnesium acetate are preferable, and potassium acetate is more preferable. The carboxylic acid metal salts may be used singly or in combinations of two or more thereof.

[Thermoplastic Resin]

The interlayer film for laminated glass of the present invention contains a thermoplastic resin. The interlayer film for laminated glass contains the thermoplastic resin, which is likely to serve a function as an adhesion layer, whereby good adhesiveness to a glass plate is provided. The thermoplastic resin serves as a matrix component in the interlayer film for laminated glass. The above carboxylic acid metal salt and a luminescent material to be described later are dispersed in the thermoplastic resin.

Examples of the thermoplastic resin include, but are not particularly limited to, a polyvinyl acetal resin, an ethylene-vinyl acetate copolymer resin, an ionomer resin, a polyurethane resin, and a thermoplastic elastomer. The use of these resins is likely to secure adhesiveness to the glass plate.

In the interlayer film for laminated glass of the present invention, the thermoplastic resins may be used singly or in combinations of two or more thereof. Among these, at least one selected from the group consisting of a polyvinyl acetal resin and an ethylene-vinyl acetate copolymer resin is preferable, and a polyvinyl acetal resin is more preferable from the viewpoint of exhibiting excellent adhesiveness to glass when the polyvinyl acetal resin is used in combination with a plasticizer.

(Polyvinyl Acetal Resin)

The polyvinyl acetal resin is obtained by acetalizing a polyvinyl alcohol with an aldehyde. The polyvinyl alcohol is obtained by saponifying a polyvinyl ester such as polyvinyl acetate, for example. The polyvinyl acetal resins may be used singly or in combinations of two or more thereof.

The aldehyde used for acetalizing is not particularly limited, and a C1 to C10 aldehyde is suitably used. A C2 to C6 aldehyde is more preferable, and a C4 aldehyde is still more preferable.

The C1 to C10 aldehyde is not particularly limited, and examples thereof include n-butyl aldehyde, isobutyl aldehyde, n-valeraldehyde, 2-ethyl butyl aldehyde, n-hexyl aldehyde, n-octyl aldehyde, n-nonyl aldehyde, n-decyl aldehyde, formaldehyde, acetaldehyde, and benzaldehyde. Among these, n-butyl aldehyde, n-hexyl aldehyde, and n-valeraldehyde are preferable, and n-butyl aldehyde is more preferable. These aldehydes may be used singly or in combinations of two or more thereof.

As the polyvinyl alcohol, a polyvinyl alcohol having a saponification degree of 80 to 99.8 mol % is generally used. In order to adjust the average polymerization degree of the polyvinyl acetal resin within a desired range, the average polymerization degree of the polyvinyl alcohol is preferably 500 or more and 4000 or less. The average polymerization degree of the polyvinyl alcohol is more preferably 1000 or more and 3600 or less. The average polymerization degree of the polyvinyl alcohol is obtained by a method based on JIS K6726 "Testing methods for polyvinyl alcohol".

The carbon number of an acetal group contained in the polyvinyl acetal resin is not particularly limited, and it is preferably 1 to 10, more preferably 2 to 6, and still more preferably 4. Specifically, the acetal group is particularly preferably a butyral group. Therefore, the polyvinyl acetal resin is preferably a polyvinyl butyral resin.

The acetalization degree of the polyvinyl acetal resin is preferably 40 mol % or more and preferably 85 mol % or less. The acetalization degree is more preferably 60 mol % or more and more preferably 75 mol % or less. The acetalization degree means a butyralization degree when the acetal group is the butyral group and the polyvinyl acetal resin is the polyvinyl butyral resin.

The amount of hydroxyl groups of the polyvinyl acetal resin is preferably 15 mol % or more and preferably 35 mol % or less. The amount of the hydroxyl groups of 15 mol % or more is likely to provide good adhesiveness to a glass plate and the like, and good penetration resistance of the laminated glass, and the like. The amount of the hydroxyl groups is set to 35 mol % or less, which prevents the laminated glass from being too hard. The amount of the hydroxyl groups of the polyvinyl acetal resin is more preferably 20 mol % or more and more preferably 33 mol % or less.

The acetylation degree (the amount of acetyl groups) of the polyvinyl acetal resin is preferably 0.1 mol % or more and preferably 20 mol % or less. When the acetylation degree is equal to or greater than the lower limit, the compatibility between the polyvinyl acetal resin and a plasticizer and the like is likely to be improved. When the acetylation degree is equal to or less than the upper limit, the moisture resistance of the interlayer film is improved. From these viewpoints, the acetylation degree is more preferably 0.3 mol % or more, and still more preferably 0.5 mol % or more. The acetylation degree is more preferably 10 mol % or less, and still more preferably 5 mol % or less.

The amount of the hydroxyl groups, the acetalization degree (butyralization degree), and the acetylation degree can be calculated from the results measured by a method based on JIS K 6728 "Testing methods for polyvinyl butyral".

The average polymerization degree of the polyvinyl acetal resin is preferably 500 or more and preferably 4000 or less. When the average polymerization degree is set to 500 or more, the laminated glass has good penetration resistance. When the average polymerization degree is set to 4,000 or less, the laminated glass is likely to be molded. The polymerization degree is more preferably 1000 or more and more preferably 3600 or less. The average polymerization degree of the polyvinyl acetal resin is the same as that of the polyvinyl alcohol as the raw material, and can be obtained by the average polymerization degree of the polyvinyl alcohol.

(Ethylene-Vinyl Acetate Copolymer Resin)

The ethylene-vinyl acetate copolymer resin may be a non-crosslinked type ethylene-vinyl acetate copolymer resin or a high temperature crosslinked type ethylene-vinyl acetate copolymer resin. There may also be used modified ethylene-vinyl acetate resins such as saponified ethylene-vinyl acetate copolymer and hydrolyzed ethylene vinyl acetate as the ethylene-vinyl acetate copolymer resin.

The ethylene-vinyl acetate copolymer resin preferably has a vinyl acetate content of 10% by mass or more and 50% by mass or less, and more preferably 20% by mass or more and 40% by mass or less, as measured based on JIS K 6730 "Testing method for ethylene-vinyl acetate resin" or JIS K 6924-2:1997. When the vinyl acetate content is set to be equal to or greater than these lower limits, the adhesiveness to the glass is increased, and the penetration resistance of the laminated glass is likely to be good. When the vinyl acetate content is set to be equal to or less than these upper limits, the breaking strength of the interlayer film for laminated glass is increased, which provides good shock resistance of the laminated glass.

(Ionomer Resin)

The ionomer resin is not particularly limited, and various ionomer resins may be used. Specific examples thereof include an ethylene-based ionomer, a styrene-based ionomer, a perfluorocarbon-based ionomer, a telechelic ionomer, and a polyurethane ionomer. Among these ionomers, an ethylene-based ionomer is preferable from the viewpoints of good mechanical strength, endurance, and transparency and the like of the laminated glass, and excellent adhesiveness to glass.

Since an ionomer of an ethylene-unsaturated carboxylic acid copolymer has excellent transparency and high toughness, the ionomer is suitably used as the ethylene-based ionomer. The ethylene-unsaturated carboxylic acid copolymer is a copolymer containing at least a constitutional unit derived from ethylene and a constitutional unit derived from unsaturated carboxylic acid, and may have a constitutional unit derived from another monomer.

Examples of the unsaturated carboxylic acid include acrylic acid, methacrylic acid, and maleic acid. Acrylic acid and methacrylic acid are preferable, and methacrylic acid is particularly preferable. Examples of the another monomer include an acrylic acid ester, a methacrylic acid ester, and 1-butene.

The ethylene-unsaturated carboxylic acid copolymer preferably contains 75 to 99 mol % of the constitutional unit derived from ethylene when all the constitutional units contained in the copolymer is 100 mol %, and preferably contains 1 to 25 mol % of the constitutional unit derived from unsaturated carboxylic acid.

The ionomer of the ethylene-unsaturated carboxylic acid copolymer is an ionomer resin obtained by neutralizing or crosslinking at least a part of carboxyl groups contained in the ethylene-unsaturated carboxylic acid copolymer with metal ions. The degree of neutralization of the carboxyl group is usually 1 to 90%, and preferably 5 to 85%.

Examples of an ion source in the ionomer resin include alkali metals such as lithium, sodium, potassium, rubidium, and cesium, and polyvalent metals such as magnesium, calcium, and zinc. Sodium and zinc are preferable.

A method for manufacturing the ionomer resin is not particularly limited, and the ionomer resin can be manufactured by a conventionally known manufacturing method. For example, when the ionomer of ethylene-unsaturated carboxylic acid copolymer is used as the ionomer resin, for example, ethylene and unsaturated carboxylic acid are subjected to radical copolymerization at elevated temperatures and pressures to manufacture an ethylene-unsaturated carboxylic acid copolymer. The ionomer of ethylene-unsaturated carboxylic acid copolymer can be manufactured by causing the ethylene-unsaturated carboxylic acid copolymer to react with a metallic compound containing the ion source.

(Polyurethane Resin)

Examples of the polyurethane resin include polyurethane obtained by causing an isocyanate compound to react with a diol compound, and polyurethane obtained by causing an isocyanate compound to react with a diol compound, and a chain extender such as polyamine. The polyurethane resin may contain a sulfur atom. In that case, a part or the whole of the diol may be selected from the group consisting of a polythiol and a sulfur-containing polyol. The polyurethane resin can provide good adhesiveness to organic glass. Therefore, when the glass plate is organic glass, the polyurethane resin is suitably used.

(Thermoplastic Elastomer)

Examples of the thermoplastic elastomer include a styrene-based thermoplastic elastomer and an aliphatic polyolefin. The styrene-based thermoplastic elastomer is not particularly limited, and a known styrene-based thermoplastic elastomer can be used. The styrene-based thermoplastic elastomer generally has a styrene monomer polymer block serving as a hard segment, and a conjugate diene compound polymer block serving as a soft segment or its hydrogenated block. Specific examples of the styrene-based thermoplastic elastomer include a styrene-isoprene diblock copolymer, a styrene-butadiene diblock copolymer, a styrene-isoprene styrene triblock copolymer, a styrene-butadiene/isoprene-styrene triblock copolymer, a styrene-butadiene-styrene triblock copolymer, and their hydrogenated products.

The aliphatic polyolefin may be a saturated aliphatic polyolefin, or may be an unsaturated aliphatic polyolefin. The aliphatic polyolefin may be a polyolefin containing a chain olefin as a monomer, or may be a polyolefin containing a cyclic olefin as a monomer. From the viewpoint of effectively improving the preservation stability of the interlayer film, and sound insulating properties, the aliphatic polyolefin is preferably a saturated aliphatic polyolefin.

Examples of the material of the aliphatic polyolefin include ethylene, propylene, 1-butene, trans-2-butene, cis-2-butene, 1-pentene, trans-2-pentene, cis-2-pentene, 1-hexene, trans-2-hexene, cis-2-hexene, trans-3-hexene, cis-3-hexene, 1-heptene, trans-2-heptene, cis-2-heptene, trans-3-heptene, cis-3-heptene, 1-octene, trans-2-octene, cis-2-octene, trans-3-octene, cis-3-octene, trans-4-octene, cis-4-octene, 1-nonen, trans-2-nonen, cis-2-nonen, trans-3-nonen, cis-3-nonen, trans-4-nonen, cis-4-nonen, 1-decene, trans-2-decene, cis-2-decene, trans-3-decene, cis-3-decene, trans-4-decene, cis-4-decene, trans-5-decene, cis-5-decene, 4-methyl-1-pentene, and vinyl cyclohexane.

[Plasticizer]

The interlayer film for laminated glass of the present invention may further contain a plasticizer. The interlayer film for laminated glass contains the plasticizer, whereby the interlayer film for laminated glass is softened. As a result, the flexibility of the laminated glass is improved, and the penetration resistance is also improved. Furthermore, high adhesiveness to the glass plate can also be exhibited. When the polyvinyl acetal resin is used as the thermoplastic resin, containing the plasticizer is particularly effective.

Examples of the plasticizer include organic ester plasticizers such as a monobasic organic acid ester and a polybasic organic acid ester, and phosphate plasticizers such as an organic phosphate plasticizer and an organic phosphite plasticizer. Among these, an organic ester plasticizer is preferable.

Examples of the monobasic organic acid ester include an ester of a glycol with a monobasic organic acid. Examples of the glycol include a polyalkylene glycol in which the number of repetitions of C2 to C4, preferably C2 or C3 alkylene units is 2 to 10, preferably 2 to 4. The glycol is a C2 to C4, preferably C2 or C3 monoalkylene glycol in which the number of repeating units is 1.

Specific examples of the glycol include ethylene glycol, diethylene glycol, triethylene glycol, tetraethylene glycol, propylene glycol, dipropylene glycol, tripropylene glycol, tetrapropylen glycol, and butylene glycol.

Examples of the monobasic organic acid include a C3 to C10 organic acid, and specific examples thereof include butyric acid, isobutyric acid, caproic acid, 2-ethylbutyric acid, 2-ethyl pentanoic acid, heptylic acid, n-octylic acid, 2-ethylhexanoic acid, n-nonylic acid, and decylic acid.

Specific examples of the monobasic organic acid include triethylene glycol di-2-ethyl butyrate; triethylene glycol di-2-ethylhexanoate; triethylene glycol dicaprylate; triethylene glycol di-n-octanoate; triethylene glycol di-n-heptanoate; tetraethylene glycol di-n-heptanoate; tetraethylene glycol di-2-ethylhexanoate; diethylene glycol di-2-ethylbutyrate; diethylene glycol di-2-ethylhexanoate; dipropylene glycol di-2-ethylbutyrate; triethylene glycol di-2-ethylpentanoate; tetraethylene glycol di-2-ethylbutyrate; diethylene glycol dicaprylate; triethylene glycol di-n-heptanoate; tetraethylene glycol di-n-heptanoate; triethylene glycol di-2-ethylbutyrate, ethylene glycol di-2-ethylbutyrate, 1,2-propylene glycol di-2-ethylbutyrate, 1,3-propylene glycol di-2-ethylbutyrate, 1,4-butylene glycol di-2-ethylbutyrate, and 1,2-butylene glycol di-2-ethylbutyrate.

Examples of the polybasic organic acid ester include an ester compound of a C4 to C12 dibasic organic acid such as adipic acid, sebacic acid, or azelaic acid and a C4 to C10 alcohol. The C4 to C10 alcohol may have a linear, branched, or cyclic structure.

Specific examples thereof include dibutyl sebacate, dioctyl azelate, dihexyl adipate, dioctyl adipate, hexylcyclohexyl adipate, diisononyl adipate, heptylnonyl adipate, dibutyl carbitol adipate, and a mixed adipic acid ester. The polybasic organic acid ester may be oil-modified sebacic alkyd. Examples of the mixed adipic acid ester include an adipic acid ester produced from two or more alcohols selected from the group consisting of a C4 to C9 alkyl alcohol, and a C4 to C9 cyclic alcohol.

Examples of the organic phosphate plasticizer include phosphoric acid esters such as tributoxyethyl phosphate, isodecyl phenyl phosphate, and triisopropyl phosphate.

The plasticizers may be used singly or in combinations of two or more thereof.

Among these plasticizers, an ester of a glycol and a monobasic organic acid is preferable, and triethylene glycol-di-2-ethylhexanoate (3GO) is particularly suitably used.

In the interlayer film for laminated glass, the content of the plasticizer is not particularly limited, and the content thereof is preferably 20 parts by mass or more and preferably 80 parts by mass or less, per 100 parts by mass of the thermoplastic resin. When the content of the plasticizer is 20 parts by mass or more, the laminated glass is moderately softened, which provides good penetration resistance and the like. When the content of the plasticizer is 80 parts by mass or less, the plasticizer is prevented from being separated from the interlayer film for laminated glass. The content of the plasticizer is preferably 30 parts by mass or more, and more preferably 35 parts by mass or more. The content of the plasticizer is more preferably 70 parts by mass or less, and still more preferably 63 parts by mass or less.

The interlayer film for laminated glass contains the thermoplastic resin, or the thermoplastic resin and the plasticizer as a main component(s). The total amount of the thermoplastic resin and the plasticizer is usually 70% by mass or more, preferably 80% by mass or more, and still more preferably 90% by mass or more and less than 100% by mass based on the total amount of the interlayer film for laminated glass.

[Luminescent Material]

The interlayer film for laminated glass of the present invention contains a luminescent material in one preferable embodiment. The luminescent material is a material which is excited when absorbing a light beam such as ultraviolet rays, and emits light having a wavelength different from an absorbed wavelength such as visible light. The interlayer film for laminated glass containing the luminescent material can be used as a luminescent layer irradiated with a light beam exciting the luminescent material, to cause the luminescent material to emit light, thereby displaying an image.

Specific examples of the luminescent material include a luminescent material having a terephthalic acid ester structure. When the interlayer film for laminated glass contains the luminescent material having a terephthalic acid ester structure, the interlayer film for laminated glass may be colored, but as described above, the use of potassium as the alkali (alkaline earth) metal makes it possible to prevent the coloring of the interlayer film.

Examples of the luminescent material having a terephthalic acid ester structure include a compound having a structure represented by the following formula (1), and a compound having a structure represented by the following formula (2). The luminescent materials may be used singly or in combinations of two or more thereof.

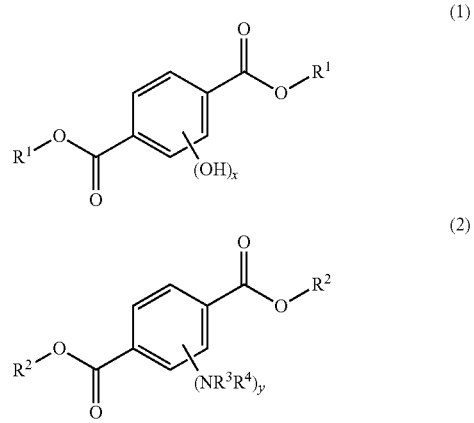

In the formula (1), $R^1$ represents an organic group, and x is 1, 2, 3, or 4. Since the transparency of the interlayer film for laminated glass is further improved, x is preferably 1 or 2, and more preferably 2. The luminescent material more preferably has a hydroxyl group on the 2- or 5-position of a benzene ring, and still more preferably has a hydroxyl group on each of the 2- and 5-positions of the benzene ring.

The organic group of the above $R^1$ is preferably a hydrocarbon group, more preferably a C1 to C10 hydrocarbon group, still more preferably a C1 to C5 hydrocarbon group, and particularly preferably a C1 to C3 hydrocarbon group. When the carbon number of the hydrocarbon group is 10 or less, the luminescent material having a terephthalic acid ester structure can be easily dispersed in the interlayer film for laminated glass. The hydrocarbon group is preferably an alkyl group.

In the above formula (2), $R^2$ represents an organic group; $R^3$ and $R^4$ represent a hydrogen atom or an organic group; and y is 1, 2, 3, or 4.

The organic group as $R^2$ is preferably a hydrocarbon group, more preferably a C1 to C10 hydrocarbon group, still more preferably a C1 to C5 hydrocarbon group, and particularly preferably C1 to C3 hydrocarbon group. When the carbon number of the hydrocarbon group is equal to or less than the upper limit, the luminescent material having a terephthalic acid ester structure can be easily dispersed in the interlayer film for laminated glass. The hydrocarbon group is preferably an alkyl group.

In the formula (2), the organic group as $R^3$ and $R^4$ is, for example, a C1 to C10 hydrocarbon group. The organic group is preferably a C1 to C5 hydrocarbon group, more preferably a C1 to C3 hydrocarbon group. The hydrocarbon group is preferably an alkyl group. Each of $R^3$ and $R^4$ is preferably a hydrogen atom.

y is preferably 1 or 2, and more preferably 2. The luminescent material more preferably has $NR^3R^4$ on the 2- or 5-position of a benzene ring, and still more preferably has $NR^3R^4$ on each of the 2- and 5-positions of the benzene ring.

It is preferable to use the compound having a structure represented by the formula (1) among the above described ones. The compound having a structure represented by the formula (1) is preferably, for example, diethyl 2,5-dihydroxyterephthalate and dimethyl 2,5-dihydroxyterephthalate. The compound having a structure represented by the formula (2) is preferably diethyl 2,5-diaminoterephthalate.

The content of the luminescent material in the interlayer film for laminated glass is not particularly limited. For example, when the luminescent material having a terephthalic acid ester structure is used, the content of the luminescent material having a terephthalic acid ester structure is preferably 0.001 parts by mass or more and 5 parts by mass or less per 100 parts by mass of the thermoplastic resin.

When the content of the luminescent material having a terephthalic acid ester structure is 0.001 parts by mass or more, and the luminescent material is irradiated with a light beam to emit light, an image having a high contrast can be displayed. When the content is 5 parts by mass or less, the interlayer film for laminated glass is less likely to be colored, which provides high transparency of the interlayer film for laminated glass.

The content of the luminescent material having a terephthalic acid ester structure is more preferably 0.01 parts by mass or more, still more preferably 0.1 parts by mass or more, and particularly preferably 0.2 parts by mass or more in order to further improve the contrast of the image. From the viewpoint of improving the transparency of the interlayer film for laminated glass, the content is more preferably 2 parts by mass or less, still more preferably 1.5 parts by mass or less, and particularly preferably 1 part by mass or less.

[Other Additives]

The interlayer film for laminated glass may further contain additives other than the above such as an infrared absorbing agent, an ultraviolet absorbing agent, an antioxidant, a light stabilizer, a fluorescent whitening agent, a nucleating agent, a dispersant, a dye, and a pigment as necessary.

The thickness of the interlayer film for laminated glass is preferably 0.1 mm or more and 3.0 mm or less. When the thickness of the interlayer film for laminated glass is set to 0.1 mm or more, a good adhesiveness and a good penetration resistance and the like of the laminated glass can be achieved. When the interlayer film for laminated glass is used as the luminescent layer, light emission having a sufficiently high contrast is obtained. When the thickness of the interlayer film for laminated glass is set to 3.0 mm or less, the transparency of the interlayer film for laminated glass is likely to be secured.

The thickness of the interlayer film for laminated glass is more preferably 0.2 mm or more, and still more preferably 0.3 mm or more. The thickness is more preferably 2.0 mm or less, and still more preferably 1.5 mm or less.

(Method for Manufacturing Interlayer Film for Laminated Glass)

The interlayer film for laminated glass of the present invention may be obtained by, for example, mixing a thermoplastic resin, a carboxylic acid metal salt, and a plasticizer, a luminescent material, and other additives blended as necessary, and molding the obtained resin composition to a sheet. At that time, the order of mixing the components is not particularly limited, but, for example, the carboxylic acid metal salt, the luminescent material, and the other additives and the like may be previously added to the plasticizer, followed by mixing, and adding the mixture to the thermoplastic resin. The plasticizer, the luminescent material, and the other additives and the like may be added to the thermoplastic resin in any suitable order, followed by mixing.

A mixer for mixing the components is not particularly limited, and known mixers such as an extruder, a Banbury mixer, a mixing roller, a kneader mixer, a grinding mixer, and a planet type stirrer can be used. The resin composition may be molded by extrusion molding and press molding and the like. For example, the resin composition may be molded by causing the extruder to extrude the resin composition to a sheet in the extrusion molding.

Here, at least one metal selected from the group consisting of a carboxylic acid, an alkali metal, and an alkaline earth metal may be mixed with other components in an aqueous solution state as a carboxylic acid metal salt, but the aqueous solution of the carboxylic acid metal salt may be mixed after being adjusted so that the pH is close to neutrality (pH=7). Specifically, for example, when the metal is an alkali metal such as sodium or potassium, the aqueous solution of the carboxylic acid metal salt may be mixed after being adjusted so that the pH is less than 10. For example, when the metal is an alkaline earth metal such as magnesium, the aqueous solution of the carboxylic acid metal salt may be mixed after being adjusted so that the pH is less than 11.

When the aqueous solution of the carboxylic acid metal salt is mixed after the pH is adjusted to less than a certain value, a carboxylic acid isolation rate in the interlayer film for laminated glass can be easily set to 40% or less although the factor is not clear.

When the aqueous solution of the carboxylic acid metal salt particularly contains the above-described luminescent material, and the aqueous solution of the carboxylic acid metal salt is mixed after the pH is adjusted to less than a certain value, deterioration in luminescent performance in the interlayer film for laminated glass can be suppressed.

From the viewpoint of reducing the carboxylic acid isolation rate, the above pH is preferably 9.5 or less, more preferably 8.5 or less, and still more preferably 8.0 or less when the metal is an alkali metal such as sodium or potassium. When the metal is an alkaline earth metal such as magnesium, the pH is preferably 10.5 or less.

Also in the case of any of the metals, the pH is preferably more than 7.0, and more preferably 7.5 or more.

The pH of the aqueous solution can be measured with "Model F-55" manufactured by Horiba, Ltd. The concentration of the carboxylic acid metal salt in the aqueous solution is not particularly limited, but the metal concentration is preferably 2 to 25% by mass, and more preferably 3 to 20% by mass.

A method for adjusting the pH of an aqueous solution of a carboxylic acid metal salt is not particularly limited. Examples thereof include a method in which a carboxylic acid such as acetic acid, and an alkali (earth)metal hydroxide such as sodium hydroxide, potassium hydroxide, or magnesium hydroxide are added to water to produce the aqueous solution of the carboxylic acid metal salt, and the blending amount of the carboxylic acid is set to be slightly excessive compared to the equivalent amount in that case. Other examples thereof include a method in which a carboxylic acid metal salt is dissolved in water, and a small amount of a carboxylic acid is additionally added to the aqueous solution to adjust the pH.

The resin composition may be molded while being heated to 160° C. or higher and 230° C. or lower, and preferably 180° C. or higher and 220° C. or lower. For example, when the interlayer film for laminated glass is industrially mass-produced, high shear is applied to the resin composition to cause a high molding temperature. Therefore, when the molding temperature is set to a comparatively high temperature such as the above temperature range, a manufacturing condition suitable for mass-production is provided. In the interlayer film for laminated glass molded while being heated to the comparatively high temperature such as the above temperature range, heat deterioration generally occurs during mixing and molding, which is less likely to properly adjust an adhesive force. The interlayer film for laminated glass is used under high temperature and high humidity, so that whitening is apt to occur in the peripheral part of the interlayer film for laminated glass. However, in the present invention, even if the molding temperature is increased, the molar concentration A is adjusted within a predetermined range as described above, and the carboxylic acid isolation rate is decreased, whereby the adhesive force can be properly adjusted, and the whitening is less likely to occur in the peripheral part even if the interlayer film for laminated glass is used under high temperature and high humidity.

<Laminated Glass>

The present invention further provides laminated glass. The laminated glass of the present invention includes two glass plates, and the interlayer film for laminated glass of the present invention interposed between the two glass plates.

In the laminated glass, a layer between the two glass plates may be composed of one resin layer, or may have a laminate structure including two or more resin layers. When the layer is composed of one resin layer, the above interlayer film for laminated glass may be used as the one resin layer. The interlayer film for laminated glass is disposed so that one surface thereof is in contact with one glass plate and the other surface is in contact with the other glass plate.

When the layer has a laminate structure including two or more resin layers, the at least one resin layer may be the above interlayer film for laminated glass of the present invention, and may contain a resin layer other than the above interlayer film for laminated glass. However, also in the case of the laminate structure, the interlayer film for laminated glass of the present invention is disposed so that one surface thereof is in contact with any one of the glass plates. The interlayer film for laminated glass of the present invention is disposed so as to be in contact with the glass plate, whereby the adhesive force between the interlayer film for laminated glass and the glass plate in contact therewith can be adjusted to a proper size.

The laminate structure may be a two-layer structure including two resin layers, a three-layer structure including three resin layers, or a structure including four or more resin layers. In the case of the two-layer structure, only one resin layer may be the above interlayer film for laminated glass of the present invention, or both the resin layers may be the above interlayer film for laminated glass of the present invention.

In the case of the three-layer structure or the structure having four or more resin layers, one or two or more intermediate layers are disposed between two surface layers, but only one of the two surface layers may be the above interlayer film for laminated glass of the present invention. Both the surface layers may be the above interlayer film for laminated glass of the present invention.

(Glass Plate)

The glass plate used in the laminated glass may be any of inorganic glass and organic glass, and inorganic glass is preferable. Examples of the inorganic glass include, but are not particularly limited to, clear glass, float plate glass, reinforced glass, colored glass, polished plate glass, molded plate glass, meshed plate glass, wired plate glass, ultraviolet absorption plate glass, infrared reflective plate glass, infrared absorption plate glass, and green glass.

As the organic glass, one generally referred to as resin glass is used without particular limitation, and examples thereof include organic glass composed of a polycarbonate plate, a polymethyl methacrylate plate, or a polyester plate or the like.

The two glass plates may be composed of the same material or different materials. For example, one of the two glass plates may be inorganic glass, and the other may be organic glass. It is preferable that each of the two glass plates is inorganic glass or organic glass.

The thickness of each of the glass plates is not particularly limited, but the thickness is, for example, about 0.1 to 15 mm, and preferably 0.5 to 5 mm. The thicknesses of the glass plates may be the same or different from each other, and are preferably the same.

The laminated glass may be manufactured by disposing the above interlayer film for laminated glass or a plurality of resin layers between two glass plates, and subjecting these to pressure bonding and the like for integrating.

The laminated glass of the present invention can be used in various fields, and is preferably used for various vehicles such as wheeled vehicles (such as automobiles and trains), vessels, and airplanes, or windshield for various constructions such as buildings, condominiums, stand-alone houses, halls, and gymnasiums.

EXAMPLES

The present invention will be described in more detail by means of Examples, but the present invention is not limited in any way by these Examples.

The molar concentration per unit volume of each of components was measured as follows.

[Molar Concentration of Metal]

0.3 g of an interlayer film for laminated glass was collected, and 6 mL of nitric acid was added thereto to dissolve the interlayer film for laminated glass. After the dissolution, the solution was made up to 50 ml with ultrapure water, and the total amount of an alkali metal atom and an alkaline earth metal atom contained in the interlayer film for laminated glass was measured by ICP emission spectrochemical analysis. A molar concentration A per unit volume of an alkali metal and an alkaline earth metal was calculated based on the measured total amount of the metal atoms. Similarly, an atomic weight of potassium contained in the interlayer film for laminated glass was measured to calculate a molar concentration C per unit volume of the potassium. The measurement conditions of the ICP emission spectrochemical analysis were as follows.

<Measurement Conditions>

Measuring apparatus: "ICPE-9000" manufactured by Shimadzu Corporation

High-frequency output: 1.2 kW Plasma gas flow rate: 10 L/min

Auxiliary gas flow rate: 0.6 L/min Carrier gas flow rate: 0.7 L/min

[Molar Concentrations B and B']

0.5 g of an interlayer film for laminated glass was collected, and 9 mL of THF was added thereto. The interlayer film for laminated glass to which THF was added was left at 23° C. for 12 hours, and 21 mL of toluene was then added thereto, followed by sonicating for 40 min under conditions of 23° C. and 38 kHz. The solution was treated in a high-speed centrifugal machine for 30 min under conditions of 5° C. and 15000 rpm to separate a polymer component. A solution component was collected and measured with GC (gas chromatography) to measure an amount of a carboxylic acid isolated in the interlayer film for laminated glass according to GC-MS. A molar concentration B (mol/m$^3$) per unit volume of the measured carboxylic acid was calculated. Similarly, an amount of a carboxylic acid other than 2-ethylhexanoic acid was measured with GC-MS, and a molar concentration B' (mol/m$^3$) per unit volume of the measured carboxylic acid other than 2-ethylhexanoic acid was calculated.

[Molar Concentrations D and D']

0.5 g of an interlayer film for laminated glass was collected, and 9 mL of THF and 0.2 mL of 1 N hydrochloric acid were added thereto. The inter layer film to which THF and 0.2 mL of 1 N hydrochloric acid were added was left at 23° C. for 12 hours, and 21 mL of toluene was then added thereto, followed by sonicating for 40 min under conditions of 23° C. and 38 kHz. The solution was treated in a high-speed centrifugal machine for 30 min under conditions of 5° C. and 15000 rpm to separate a polymer component. A solution component was measured with GC (gas chromatography) to measure an amount of a carboxylic acid according to GC-MS. A molar concentration Y (mol/m$^3$) per unit volume of the measured carboxylic acid was calculated. Similarly, an amount of a carboxylic acid other than 2-ethylhexanoic acid was measured with GC-MS, and a molar concentration Y' (mol/m$^3$) per unit volume of the measured carboxylic acid other than 2-ethylhexanoic acid was calculated.

Values obtained by subtracting the molar concentrations B and B' from the molar concentrations Y and Y' were calculated as molar concentrations D and D' per unit volume of the carboxylic acid.

The measurement conditions of gas chromatography were as follows.

<Measurement Conditions>

Apparatus: "Model GC-2010" manufactured by Shimadzu Corporation

Column: DB-FFAP (0.53 mm×30 m)

Oven temperature: held at 40° C. for 5 min, raised at 10° C./min, and then held at 240° C.

Injection port temperature: 240° C.

Detector temperature: 250° C.

Injection rate: 1.0 μl

A method for evaluating the laminated glass and the interlayer film for laminated glass obtained in each of the present Examples and Comparative Examples is as follows.

[Adhesive Force]

The laminated glass manufactured in each of Examples and Comparative Examples was left under a temperature environment of −18° C.±0.6° C. for 16 hours. A central part (portion of 150 mm long×150 mm wide) of the laminated glass was hit by a hammer having a head part of 0.45 kg, and pulverized until a glass particle diameter was set to 6 mm or less, and a degree of exposure of the film after glass was partially peeled off was measured, to obtain a pummel value in Table 1. An average value of six measured values was adopted as the pummel value. When the pummel value was 2 to 7, an adhesive force could be properly adjusted, which was evaluated as "A". When the pummel value was 1 or less or 8 or more, the adhesive force could not be properly adjusted, which was evaluated as "B".

TABLE 1

| Degree of exposure of interlayer film (area %) | Pummel value |
| --- | --- |
| 90 < Degree of exposure ≤ 100 | 1 |
| 85 < Degree of exposure ≤ 90 | 2 |
| 60 < Degree of exposure ≤ 85 | 3 |
| 40 < Degree of exposure ≤ 60 | 4 |
| 20 < Degree of exposure ≤ 40 | 5 |
| 10 < Degree of exposure ≤ 20 | 6 |
| 5 < Degree of exposure ≤ 10 | 7 |
| 2 < Degree of exposure ≤ 5 | 8 |
| Degree of exposure ≤ 2 | 9 |

[Moisture Resistance]

The obtained laminated glass was left under an environment of 80° C. and humidity of 95% RH for two weeks, and a whitening distance from each of corner parts of the laminated glass, and a whitening distance from a central portion of each of sides were then measured. A maximum value of the whitening distances from the corner parts of the laminated glass, and a maximum value of the whitening distances from the central portions of the sides were obtained. When the maximum value of the whitening distances from the corner parts was 40 mm or less, and the maximum value of the whitening distances from the central portions of the sides was 10 mm or less, moisture resistance was good, which was evaluated as "A". The rest caused insufficient moisture resistance, which was evaluated as "B".

[Yellowness]

Using a spectrophotometer (U-4100 manufactured by Hitachi high-technologies corporation), a yellow index value (YI value) of the obtained laminated glass was measured based on JIS Z 8722. A case where the YI value was 0 or more and 20 or less was evaluated as "A", and a case where the YI value was more than 20 was evaluated as "B".

A thermoplastic resin, a plasticizer, and a luminescent material used in Examples and Comparative Examples are as follows.

Thermoplastic resin: polyvinyl butyral resin (PVB), acetalization degree of 69 mol %, amount of hydroxyl groups of 30 mol %, acetylation degree of 1 mol %, polymerization degree of 1700

Plasticizer: triethylene glycol di-2-ethylhexanoate (3GO)

Luminescent material: dimethyl 2,5-dihydroxyterephthalate (DMDHTF)

The 3GO used in Examples was adjusted so that 2-ethylhexanoic acid was not excessive, and then produced by a condensation reaction. Therefore, the 2-ethylhexanoic acid was not detected. The 2-ethylhexanoic acid was not also detected in the interlayer film.

Examples 1 to 3 and Comparative Examples 1 to 4

Using HAAKE PolyLab OS RheoDrive 16 and Reomex OS (manufactured by Thermo Scientific), 100 parts by mass of a thermoplastic resin, 40 parts by mass of a plasticizer, and a carboxylic acid metal salt aqueous solution were kneaded while being heated to 200° C., to obtain a resin composition. The resin composition was extruded to a sheet to obtain an interlayer film for laminated glass having a thickness of 0.76 mm.

The carboxylic acid metal salt solutions of Examples 1 to 3 and Comparative Examples 1 to 4 were produced by adding acetic acid and potassium hydroxide to water. At that time, the carboxylic acid metal salt aqueous solutions were adjusted so that the concentration of potassium in the aqueous solution was set to 15% by mass and pH described in Table 2 was set. Each of the carboxylic acid metal salt aqueous solutions was blended in the resin composition so that the molar concentration A of the alkali (alkaline earth) metal in the interlayer film for laminated glass was set to an amount described in Table 2.

(Manufacture of Laminated Glass)

The interlayer film for laminated glass obtained above was held under constant temperature and humidity conditions of 23° C. and 28% RH for 4 hours, and then sandwiched between two clear glasses (300 mm long×300 mm wide×2.5 mm thick) to obtain a laminated body. The obtained laminated body was subjected to preliminary pressure bonding using a heating roller at 170° C. The laminated body subjected to preliminary pressure bonding was subjected to pressure bonding using an autoclave under conditions of 140° C. and pressure of 1 MPa for 20 min, to produce laminated glass. The evaluation results of the obtained laminated glass are shown in Table 2.

Examples 4 to 7

0.54 parts by mass of a luminescent material was added to 40 parts by mass of a plasticizer, to prepare a plasticizer solution. Using HAAKE PolyLab OS RheoDrive 16 and Reomex OS (manufactured by Thermo Scientific), the obtained plasticizer solution, 100 parts by mass of a thermoplastic resin, and a carboxylic acid metal salt aqueous solution were kneaded while being heated to 200° C., to obtain a resin composition. The resin composition was extruded to a sheet to obtain an interlayer film for laminated glass. Then, laminated glass was produced by the same method as that of Example 1. The evaluation results of the obtained laminated glass are shown in Table 3.

In Examples 4 and 5, carboxylic acid metal salt aqueous solutions prepared in the same manner as in Examples 1 to 3 were used. Carboxylic acid metal salt aqueous solutions of Examples 6 and 7 were produced by adding acetic acid and magnesium hydroxide to water. At that time, the carboxylic acid metal salt aqueous solutions were adjusted so that the concentration of magnesium in the aqueous solution was set to 3.65% by mass and pH described in Table 3 was set. Each of the carboxylic acid metal salt aqueous solutions was added so that the molar concentration A of the alkali (alkaline earth) metal in the interlayer film for laminated glass was set to an amount described in Table 3.

TABLE 2

| | | | | Example 1 | Example 2 | Example 3 | Comparative Example 1 | Comparative Example 2 | Comparative Example 3 | Comparative Example 4 |
|---|---|---|---|---|---|---|---|---|---|---|
| Interlayer film | Thermoplastic resin | Kinds | — | PVB | PVB | PVB | PVB | PVB | PVB | PVB |
| | | Number of parts | Parts by mass | 100 | 100 | 100 | 100 | 100 | 100 | 100 |
| | Plasticizer | Kinds | — | 3GO | 3GO | 3GO | 3GO | 3GO | 3GO | 3GO |
| | | Number of parts | Parts by mass | 40 | 40 | 40 | 40 | 40 | 40 | 40 |
| | Carboxylic acid metal salt | Carboxylic acid species | — | Acetic acid | Acetic acid | Acetic acid | Acetic acid | Acetic acid | Acetic acid | Acetic acid |
| | | Metal species | — | Potassium | Potassium | Potassium | Potassium | Potassium | Potassium | Potassium |
| | | Alkali (alkaline earth) metal, molar concentration A | mol/m$^3$ | 0.872 | 0.885 | 0.865 | 0.874 | 0.876 | 0.291 | 1.745 |
| | | Carboxylic acid, molar concentration B (B') | mol/m$^3$ | 0.076 | 0.246 | 0.284 | 0.416 | 0.473 | 0.025 | 0.832 |
| | | Potassium, molar concentration C | mol/m$^3$ | 0.872 | 0.885 | 0.865 | 0.874 | 0.876 | 0.291 | 1.745 |
| | | Carboxylic acid, molar concentration D (D') | mol/m$^3$ | 0.814 | 0.655 | 0.598 | 0.453 | 0.389 | 0.274 | 0.902 |
| | | Carboxylic acid isolation rate (1)(3) ((1 − D(D')/A) × 100) | % | 6.7 | 26.0 | 30.9 | 48.2 | 55.6 | 5.8 | 48.3 |
| | | Carboxylic acid isolation rate (2)(4) (B(B')/A × 100) | % | 8.7 | 27.8 | 32.8 | 47.6 | 53.9 | 8.7 | 47.7 |
| | | pH of aqueous solution during addition | — | 7.84 | 8.34 | 9.4 | 10.3 | 11.1 | 7.84 | 10.3 |
| Evaluation results | Adhesive force | Pummel | — | 3 | 4 | 6 | 8 | 9 | 9 | 3 |
| | | Determination | — | A | A | A | B | B | B | A |
| | Moisture resistance | Whitening distance (corner) | mm | 5 | 5 | 5 | 5 | 5 | 5 | 13 |
| | | Whitening distance (side) | mm | 15 | 15 | 15 | 15 | 15 | 15 | 50 |
| | | Determination | — | A | A | A | A | A | A | B |
| | Yellowness | YI | — | 1.1 | 0.9 | 1.0 | 1.0 | 1.0 | 1.1 | 0.9 |
| | | Determination | — | A | A | A | A | A | A | A |

TABLE 3

| | | | | Example 4 | Example 5 | Example 6 | Example 7 |
|---|---|---|---|---|---|---|---|
| Interlayer film | Thermoplastic resin | Kinds | — | PVB | PVB | PVB | PVB |
| | | Number of parts | Parts by mass | 100 | 100 | 100 | 100 |
| | Plasticizer | Kinds | — | 3GO | 3GO | 3GO | 3GO |
| | | Number of parts | Parts by mass | 40 | 40 | 40 | 40 |
| | Luminescent material | Kinds | — | DMDHTF | DMDHTF | DMDHTF | DMDHTF |
| | | Number of parts | Parts by mass | 0.54 | 0.54 | 0.54 | 0.54 |
| | Carboxylic acid metal salt | Carboxylic acid species | — | Acetic acid | Acetic acid | Acetic acid | Acetic acid |
| | | Metal species | — | Potassium | Potassium | Magnesium | Magnesium |
| | | Alkali (alkaline earth) metal, molar concentration A | mol/m$^3$ | 0.869 | 0.872 | 0.407 | 0.421 |
| | | Carboxylic acid, molar concentration B (B') | mol/m$^3$ | 0.074 | 0.294 | 0.078 | 0.053 |
| | | Potassium, molar concentration C | mol/m$^3$ | 0.869 | 0.872 | 0.000 | 0.000 |
| | | Carboxylic acid, molar concentration D (D') | mol/m$^3$ | 0.816 | 0.590 | 0.302 | 0.354 |
| | | Carboxylic acid isolation rate (1)(3) ((1 − D/(D')/A) × 100) | % | 6.1 | 32.4 | 25.8 | 15.9 |
| | | Carboxylic acid isolation rate (2)(4) (B(B')/A × 100) | % | 8.7 | 32.5 | 19.2 | 12.6 |
| | | pH of aqueous solution during addition | — | 7.84 | 9.4 | 10.3 | 9.9 |
| Evaluation results | Adhesive force | Pummel | — | 3 | 6 | 2 | 2 |
| | | Determination | — | A | A | A | A |
| | Moisture resistance | Whitening distance (corner) | mm | 5 | 5 | 5 | 5 |

TABLE 3-continued

|  |  |  | Example 4 | Example 5 | Example 6 | Example 7 |
|---|---|---|---|---|---|---|
|  | Whitening distance (side) | mm | 15 | 15 | 15 | 15 |
|  | Determination |  | — | A | A | A | A |
| Yellowness | YI |  | — | 6.5 | 6.7 | 21.5 | 21.3 |
|  | Determination |  | — | A | A | B | B |

As described above, in each of Examples, by setting the molar concentrations (1) to (4) of the isolated carboxylic acid to 40% or less while adjusting the molar concentration A of the alkali (alkaline earth) metal within a predetermined range, good moisture resistance could be provided while the adhesive force could be properly adjusted. Meanwhile, in Comparative Examples, when at least one of the molar concentration A of the alkali (alkaline earth) metal and the molar concentration B of the isolated carboxylic acid is outside of a predetermined range, the properly adjusted adhesive force and the improved moisture resistance could not be achieved at the same time.

The invention claimed is:

1. An interlayer film for laminated glass, comprising:
a thermoplastic resin;
a carboxylic acid; and
at least one metal selected from the group consisting of an alkali metal and an alkaline earth metal,
a molar concentration A being more than 0.35 mol/m$^3$ and less than 1.00 mol/m$^3$, and
a carboxylic acid isolation rate (1) represented by (1−D/A)×100 being 40% or less,
wherein A is a molar concentration per unit volume (mol/m$^3$) of the alkali metal and the alkaline earth metal in the interlayer film for laminated glass, measured by ICP emission spectrophotometry;
D is a molar concentration per unit volume (mol/m$^3$) of the carboxylic acid, obtained by subtracting the molar concentration B from the molar concentration Y;
B is a molar concentration per unit volume (mol/m$^3$) of the carboxylic acid in the interlayer film for laminated glass, measured by gas chromatography mass spectrometry (GC-MS); and
Y is a molar concentration per unit volume (mol/m$^3$) of the carboxylic acid in the interlayer film for laminated glass, measured by gas chromatography mass spectrometry (GC-MS) after 9 mL of THF and 0.2 mL of a 1 mol/L hydrochloric acid aqueous solution are added to 0.5 g of the interlayer film for laminated glass to be left at 23° C. for 12 hours.

2. An interlayer film for laminated glass comprising:
a thermoplastic resin;
a carboxylic acid; and
at least one metal selected from the group consisting of an alkali metal and an alkaline earth metal,
a molar concentration A is more than 0.35 mol/m$^3$ and less than 1.00 mol/m$^3$, and
a carboxylic acid isolation rate (2) represented by B/A× 100 is 40% or less,
wherein A is a molar concentration per unit volume (mol/m$^3$) of the alkali metal and the alkaline earth metal in the interlayer film for laminated glass, measured by ICP emission spectrophotometry; and
B is a molar concentration per unit volume (mol/m$^3$) of the carboxylic acid in the interlayer film for laminated glass, measured by gas chromatography mass spectrometry (GC-MS).

3. An interlayer film for laminated glass comprising:
a thermoplastic resin;
a carboxylic acid;
at least one metal selected from the group consisting of an alkali metal and an alkaline earth metal; and
2-ethylhexanoic acid,
a molar concentration A is more than 0.35 mol/m$^3$ and less than 1.00 mol/m$^3$, and
a carboxylic acid isolation ratio (3) represented by (1−D'/A)×100 is 40% or less,
wherein A is a molar concentration per unit volume (mol/m$^3$) of the alkali metal and the alkaline earth metal in the interlayer film for laminated glass, measured by ICP emission spectrophotometry;
D' is a molar concentration per unit volume (mol/m$^3$) of the carboxylic acid, obtained by subtracting the molar concentration B' from the molar concentration Y';
B' is a molar concentration per unit volume (mol/m$^3$) of the carboxylic acid other than 2-ethylhexanoic acid in the interlayer film for laminated glass, measured by gas chromatography mass spectrometry (GC-MS); and
Y' is a molar concentration per unit volume (mol/m$^3$) of the carboxylic acid other than 2-ethylhexanoic acid in the interlayer film for laminated glass, measured by gas chromatography mass spectrometry (GC-MS) after 9 mL of THF and 0.2 mL of 1 mol/L hydrochloric acid are added to 0.5 g of the interlayer film for laminated glass to be left at 23° C. for 12 hours.

4. An interlayer film for laminated glass comprising:
a thermoplastic resin;
a carboxylic acid;
at least one metal selected from the group consisting of an alkali metal and an alkaline earth metal; and
2-ethylhexanoic acid,
a molar concentration A being more than 0.35 mol/m$^3$ and less than 1.00 mol/m$^3$, and
a carboxylic acid isolation rate (4) represented by B'/A x 100 being 40% or less,
wherein A is a molar concentration per unit volume (mol/m$^3$) of the alkali metal and the alkaline earth metal in the interlayer film for laminated glass, measured by ICP emission spectrophotometry; and
B' is a molar concentration per unit volume (mol/m$^3$) of the carboxylic acid other than 2-ethylhexanoic acid in the interlayer film for laminated glass, measured by gas chromatography mass spectrometry (GC-MS).

5. The interlayer film for laminated glass according to claim 1, wherein the metal contains potassium.

6. The interlayer film for laminated glass according to claim 5, wherein, when a molar concentration per unit volume of the potassium in the interlayer film for laminated glass, measured by ICP emission spectrophotometry is C (mol/m$^3$), C/A is 0.6 or more.

7. The interlayer film for laminated glass according to claim 1, wherein the carboxylic acid contains acetic acid.

8. The interlayer film for laminated glass according to claim 1, wherein a content of formic acid is 0.2 parts by mass or less per 100 parts by mass of the thermoplastic resin.

9. The interlayer film for laminated glass according to claim 1, wherein the thermoplastic resin is a polyvinyl acetal resin.

10. The interlayer film for laminated glass according to claim 1, further comprising a luminescent material.

11. The interlayer film for laminated glass according to claim 10, wherein the luminescent material has a terephthalic acid ester structure.

12. Laminated glass comprising:
the interlayer film for laminated glass according to claim 1; and
two glass plates,
wherein the interlayer film for laminated glass is disposed between the two glass plates.

* * * * *